United States Patent [19]

Grujanac

[11] Patent Number: 4,765,889
[45] Date of Patent: Aug. 23, 1988

[54] MOVING BRIDGE FILTER - TELESCOPING FLOATING POT SKIMMER

[75] Inventor: Peter Grujanac, Bartlett, Ill.

[73] Assignee: Lakeside Equipment Corporation, Bartlett, Ill.

[21] Appl. No.: 34,668

[22] Filed: Apr. 6, 1987

[51] Int. Cl.⁴ ............................................. B01D 23/20
[52] U.S. Cl. .................................. 210/121; 210/276; 210/523; 210/540
[58] Field of Search .............. 210/275, 276, 121, 122, 210/523, 540, 793, 794, 923

[56] References Cited

U.S. PATENT DOCUMENTS

| | | | |
|---|---|---|---|
| 706,526 | 8/1902 | Carlisle | 405/89 |
| 2,427,102 | 12/1945 | Hale | 210/153 |
| 2,579,304 | 12/1951 | Crawford | 210/242.1 |
| 3,239,061 | 3/1966 | Horning et al. | 210/293 |
| 3,303,932 | 2/1967 | Hirs et al. | 210/242.1 |
| 3,305,092 | 2/1967 | Turk | 210/276 |
| 3,633,749 | 1/1972 | Panosh | 210/121 |
| 3,794,175 | 2/1974 | Stewart | 210/923 |
| 4,046,693 | 9/1977 | Glover | 210/141 |
| 4,166,036 | 8/1979 | Barnhouser | 210/242.1 |
| 4,290,887 | 9/1981 | Brown et al. | 210/242.1 |
| 4,325,150 | 4/1982 | Buddy | 210/121 |
| 4,333,829 | 6/1982 | Walther | 210/242.1 |
| 4,540,487 | 9/1985 | Johnson et al. | 210/276 |

Primary Examiner—Richard V. Fisher
Assistant Examiner—Richard D. Jordan
Attorney, Agent, or Firm—Wood, Dalton, Phillips, Mason & Rowe

[57] ABSTRACT

A filter compartment containing water with surface scum is bounded by first and second end walls and spaced side walls, the latter of which are spanned by a moving bridge. The bridge is movable between the ends of the compartment and has associated nozzles which direct a pressurized air or other fluid angularly against the upper surface of the scum layer to skim the scum towards at least one collecting pot, in which scum is collected, and from which the scum is withdrawn for delivery to a scum pit for further treatment or disposal.

8 Claims, 5 Drawing Sheets

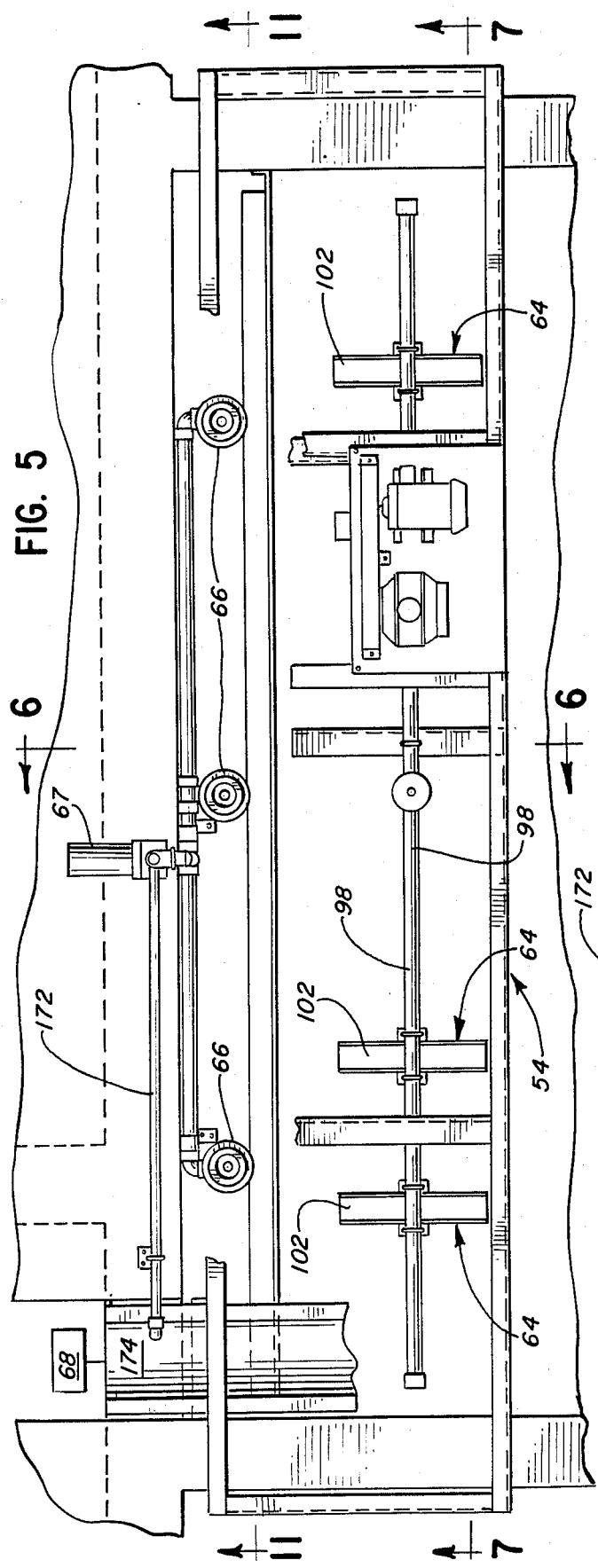
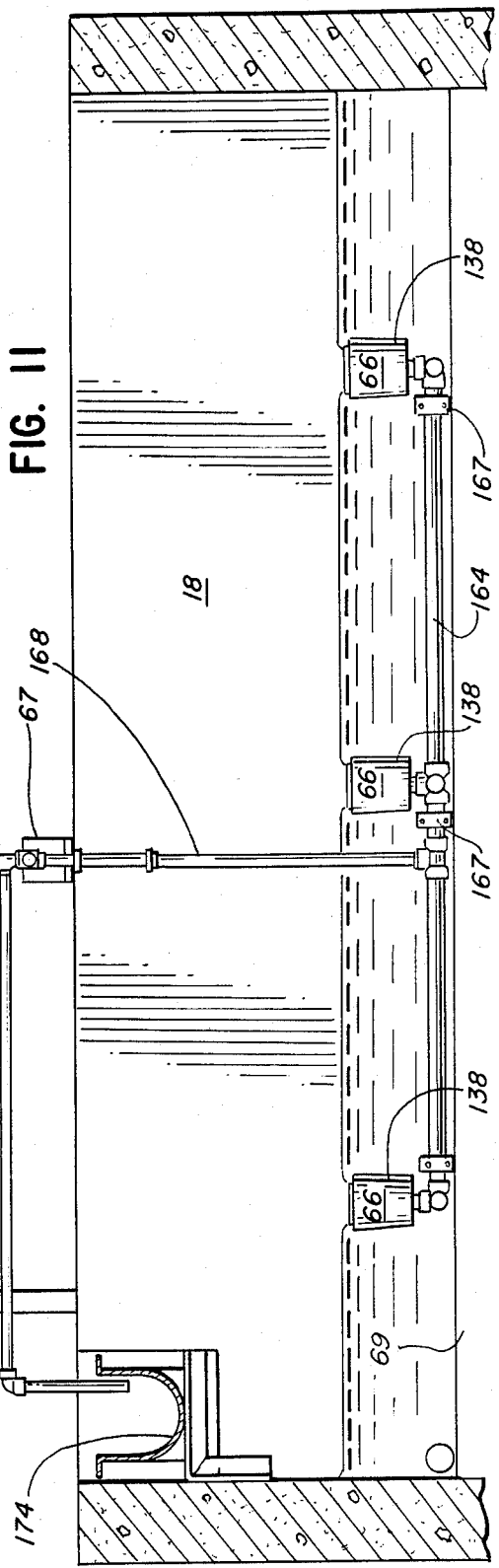

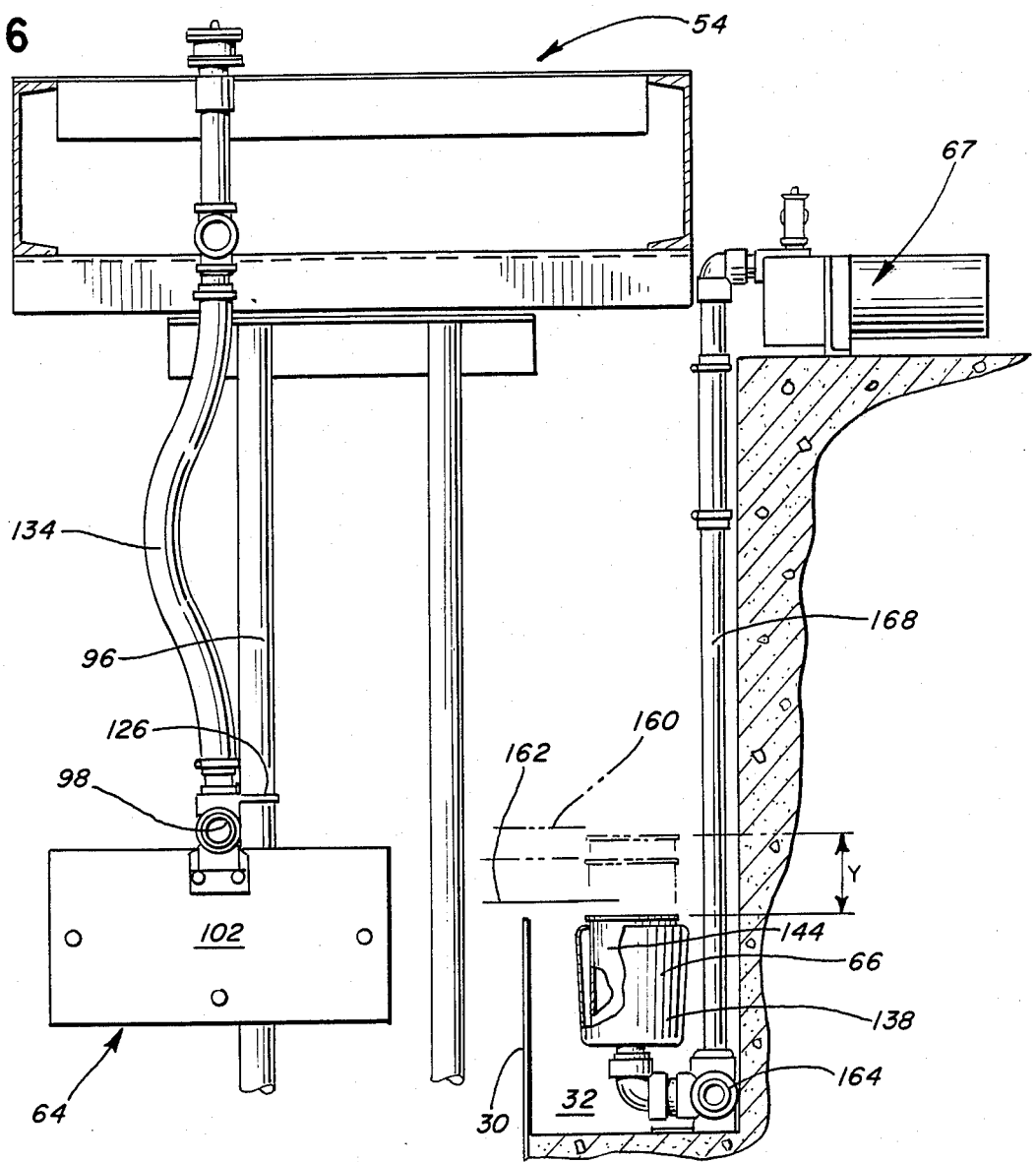

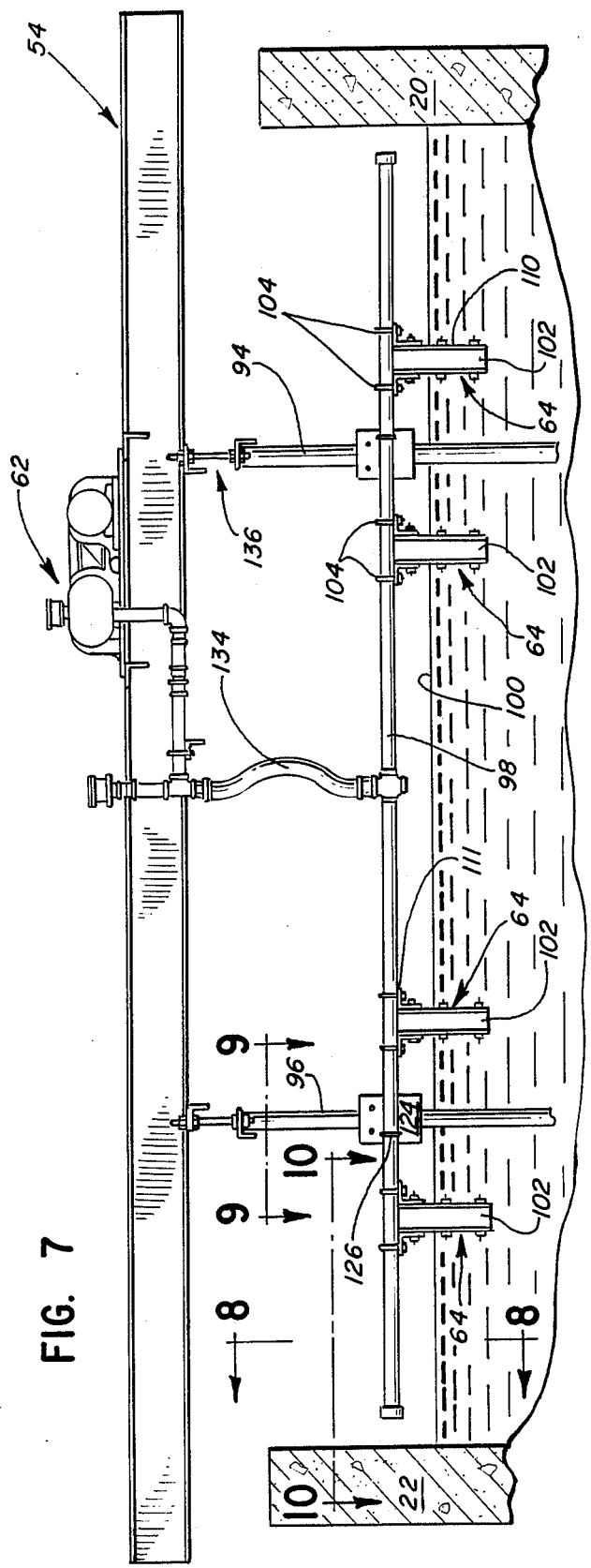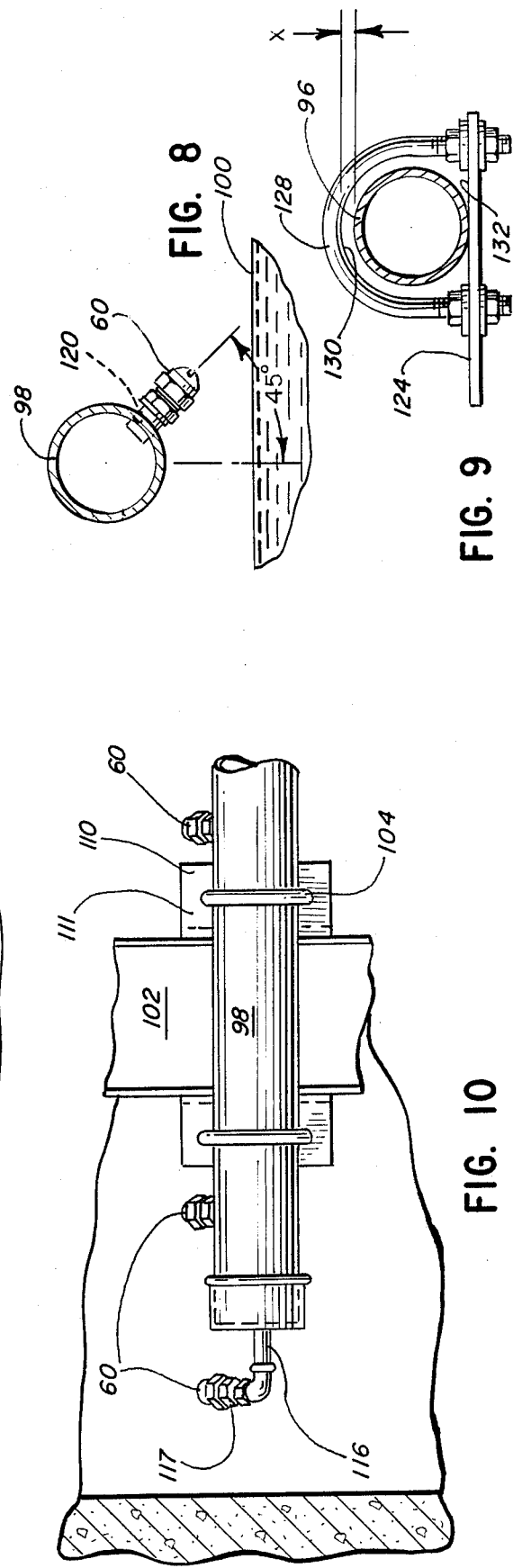

MOVING BRIDGE FILTER - TELESCOPING FLOATING POT SKIMMER

BACKGROUND OF THE INVENTION

1. Field of the Invention

This invention relates to waste water treatment systems and, more particularly, to structure for skimming surface scum off water in a filter compartment.

2. Background Art

"Moving bridge filters" have long been used with a high degree of success in treating waste water. This type of filter typically utilizes sand as a filtering media and is provided with a media bed which is divided into a number of compartments or cells. Each of the cells, in turn, is provided with a port from which purified water may flow to a point of disposition after water to be purified has been introduced into the filter above the cells.

As is well known, during the course of use of such filters, the upper surface of the filter media progressively becomes clogged by material filtered from the influent water and periodically such material must be removed to maintain the filtering efficiency of the system. In a typical moving bridge filter, a hood-like structure, typically termed a waste water manifold is suspended from a moving bridge and may be moved over the bed of filtering material to be aligned over any one of the cells. A backwash manifold assembly is moved in unison therewith to align with the individual port for the corresponding cell. Backwash water is then introduced into such port to pass upwardly through the filter media in the corresponding cell. As the backwash water passes through the filter media in each cell, it loosens and carries with it clogging material which is collected by the waste water pump and manifold. Some of the dislodged material may escape the waste water manifold and will float to the surface of the water to accumulate as a scum layer, which must be periodically skimmed and disposed of.

SUMMARY OF THE INVENTION

The principal objective of the present invention is to efficiently skim out accumulated surface scum in a filter compartment for disposal thereof.

Typically, a filter compartment for containing water with surface scum is bounded by first and second end walls and spaced side walls, the latter of which are spanned by a moving bridge. According to the invention, telescoping scum collection pots are provided at the end of a filter compartment next to one of the end walls for surface scum collection. The bridge is movable between the ends of the compartment and has associated nozzles which direct a pressurized air or other fluid angularly against the upper surface of the scum layer to direct the scum towards the scum collection pots. The accumulated scum can be withdrawn over floating pot sleeves into chambers defined by pot casings to a scum pit, for further treatment or disposal.

In a preferred form, the pot consists of the casing, within which a floating, cylindrical sleeve is telescopingly mated. The sleeve and casing cooperatively define a variable volume collection chamber for the scum. The sleeve has an open upper end with a peripheral, radial flange that floats slightly below the level of the water so that surface scum flows freely into the pot chamber.

As the filter becomes clogged, the incoming water flow rate exceeds the outflow rate and the level of water in the filter compartment rises. At a predetermined level, a control initiates backwashing which proceeds until the water level recedes to a second predetermined level. The sleeve is movable in the casing within the range of water level change and thus will collect the scum during the scum skimming operation.

DESCRIPTION OF THE DRAWINGS

FIG. 5 is a detailed, plan view of the moving bridge at a scum collection location in the inventive filter system;

FIG. 6 is a sectional view of the bridge and scum collection location taken along line 6—6 of FIG. 5;

FIG. 7 is a sectional view of the moving bridge taken along line 7—7 of FIG. 5;

FIG. 8 is a an enlarged sectional view of a manifold pipe carried by the bridge with scum skimming pressurized air or other fluid nozzles and taken along line 8—8 of FIG. 7;

FIG. 9 is an enlarged, sectional view of a floating mount for the manifold pipe carried by the bridge and taken along line 9—9 of FIG. 7.

FIG. 10 is an enlarged, fragmentary view of the scum skimming nozzles taken along line 10—10 of FIG. 7;

FIG. 11 is a sectional view of the scum collecting portion of the filter system taken approximately along the line 11—11 in FIG. 5; and FIG. 12 is an enlarged, fragmentary, elevation view of a scum withdrawal pot at the scum collection chamber location of the system.

DESCRIPTION OF THE PREFERRED EMBODIMENT

Figure 1:
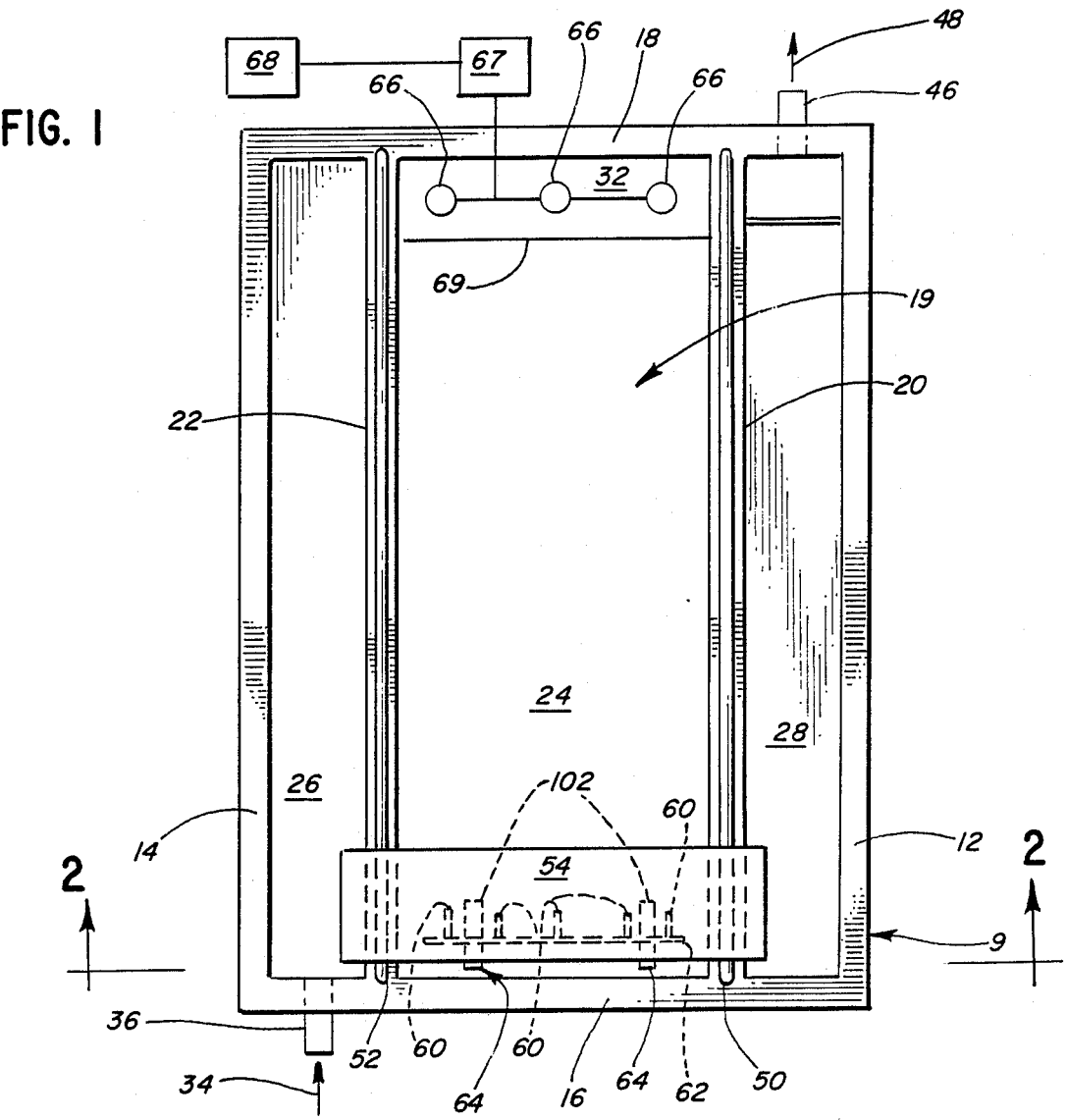
FIG. 1 is a schematic, plan view of a moving bridge filter system according to the present invention.
Figure 2:
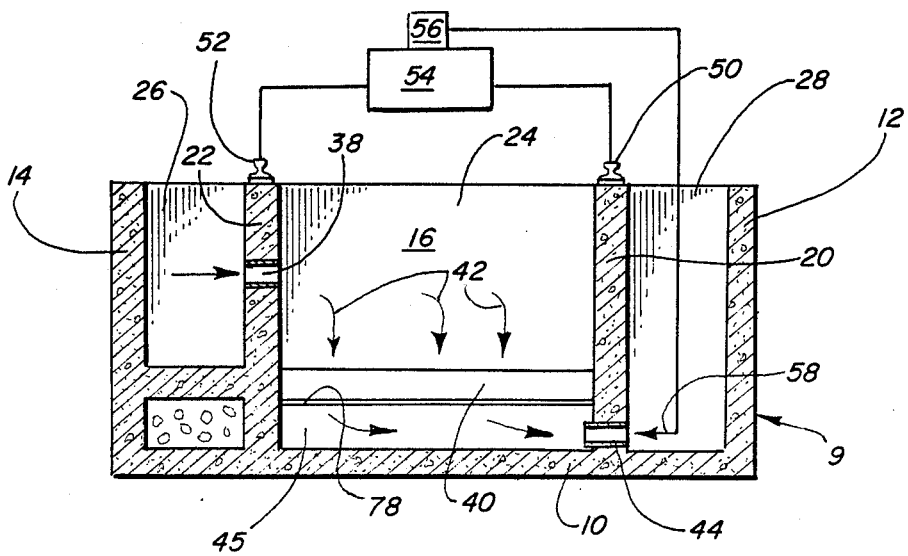
FIG. 2 is a sectional view of the filtering system taken along line 2—2 of FIG. 1.
Figure 3:
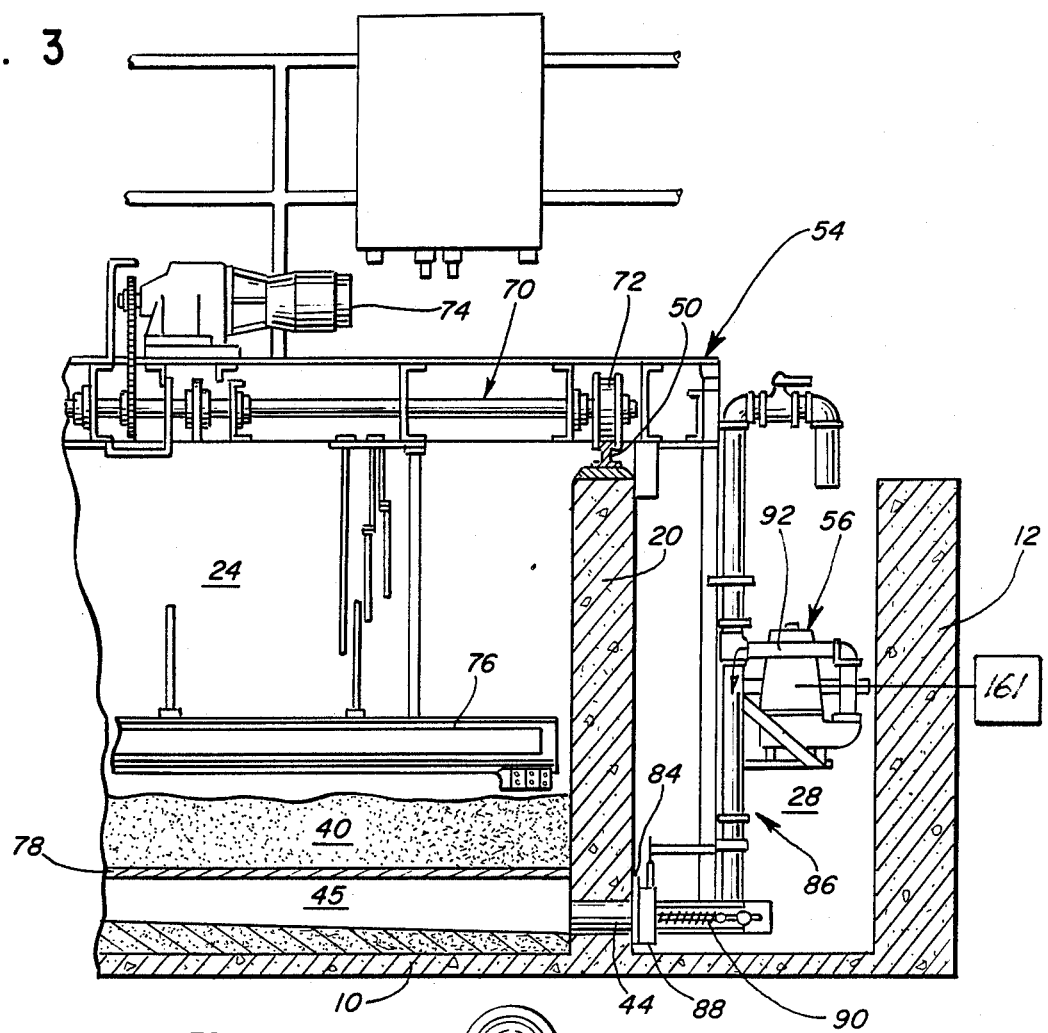
FIG. 3 is a fragmentary, vertical section view of backwash structure for the system in FIGS. 1 and 2.

A schematic representation of an entire liquid filter system, according to the present invention, is shown in FIGS. 1 and 2. The overall system is referred to in the industry as a "moving bridge filter". The filter has a poured concrete frame 9 consisting of a bottom wall 10, spaced side walls 12, 14, extending upwardly from the bottom wall 10, and opposite end walls 16, 18. The walls 10-18 cooperatively bound a space 19 for the retention and treatment of waste water.

The space 19 is compartmentalized by laterally spaced, upright walls 20, 22, extending between the frame ends 16, 18. The walls 20, 22 divide the space 19 into a central filter compartment 24, an influent channel 26 and an effluent channel 28. An effluent weir 29 maintains a predetermined water level inside of the effluent channel 28 as required for backwash pump operation as hereafter described. Scum collection pots 66 are located adjacent to the end wall 18.

In operation, water to be filtered is delivered in the direction of arrow 34 through an influent inlet pipe 36 into the influent channel 26. A plurality of ports 38 communicate through wall 22 between the influent channel 26 and filter compartment 24. The water delivered through the pipe 36 flows through a bed of filter media 40 under the influence of gravity in the direction of arrows 42 and passes through ports 44 in wall 20, which ports communicate between a space 45 beneath the filter media 40 and the effluent channel 28. Filtered water is discharged from the effluent channel 28 through an outlet pipe 46 (FIG. 1) in the direction of arrow 48 to a point of use.

Rails 50, 52 are provided on the top of the walls 20, 22 and guide translation of a so-called "moving bridge" 54 back and forth between the frame end walls 16, 18. The bridge 54 has an associated backwash pump 56 for forcibly delivering water in the direction of arrows 58 through the ports 44 to break up accumulated material clogging the filtering media 40. The broken up clogging material floats upwardly in the filter compartment 24 and accumulates as a surface scum layer.

The bridge 54 carries a plurality of nozzles 60 for directing air or other fluid from a pressurized source 62 angularly downwards towards the upper surface of the water in the compartment 24 and the end wall 18. The fluid may be, for example, air or water. One or more float means 64 maintain the nozzles 60 adjacent the upper level of the water within the filter compartment 24. As the bridge moves in the direction of end wall 18, the nozzles 60 skim the surface scum towards the wall 18 and floating collecting pots 66 where the scum is collected through the pots 66. A pump 67 automatically draws off the collected scum to a scum pit 68 for further treatment or disposal. A stepped wall 69 adjacent end wall 18 reduces the effective depth of the water in the compartment 24 adjacent the pots 66.

The structural details of the system in FIGS. 1 and 2 are shown in FIGS. 3-12. The details of the filtering and backwashing structure are shown specifically in FIGS. 3 and 4. The bridge 54 has a carriage assembly at 70 with associated wheels 72 for rolling movement along the rails 50, 52. A conventional propulsion mechanism 74 is utilized to provide the requisite movement of the bridge.

Figure 4:
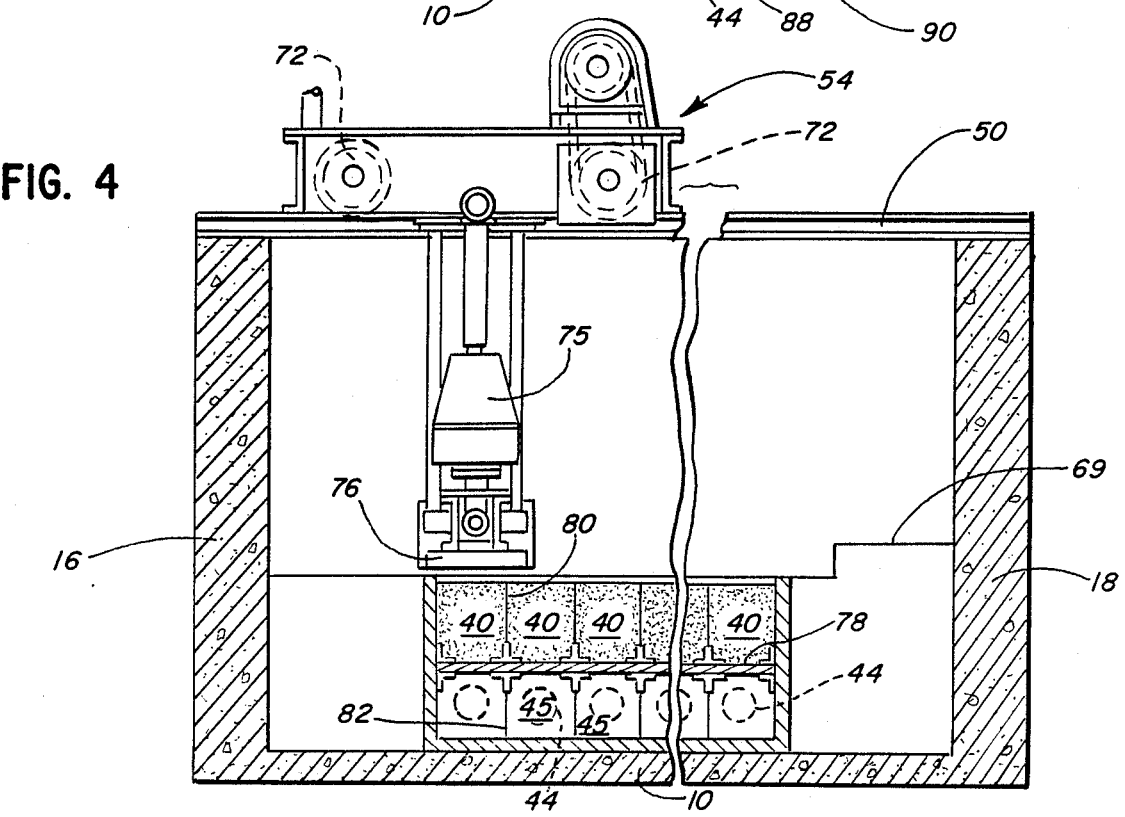
FIG. 4 is a side elevation section of the backwash structure in FIG. 3.

Within the filter compartment 24, the bridge 54 carries in depending fashion a conventional waste water pump 75 and manifold 76, which is disposed above the upper surface of the filter media 40, usually sand, which in turn is supported on porous block 78 spaced above the bottom wall 10. As best seen in FIG. 4, cell plates 80 are vertically oriented and extend upwardly from the porous block 78 and downwardly therefrom to the filter floor. They serve to define the individual cells, previously mentioned.

Between each partition along the length of the wall 20, and between the porous block 78 and the base 10 are the aforementioned backwash ports 44. The ports 44 and their location are shown in phantom in FIG. 4 since, in reality, they are located in the wall 20, which is not illustrated in FIG. 4.

Returning to FIG. 3, along the length of the wall 20, in the effluent channel 28, and about the ports 44, there is provided an elongate shoe bearing plate 84, which has mating apertures (not shown) aligned with the corresponding end of each of the ports 44. A backwash manifold assembly, generally designated 86, is carried by the bridge 54 within the effluent channel 28 and includes a shoe structure 88, which may be of conventional construction, and which is biased by a spring 90 against the plate 84. The backwash pump 56 directs backwash water through a conduit 92 to the shoe 88 which, assuming it is aligned with one of the ports 44, injects backwash water into the corresponding cell.

As previously mentioned, it is periodically necessary to clean the filter media 40 of accumulated material and this is done on a cell by cell basis, for the reason that the remaining cells may still remain operative to purify influent water throughout the cleaning process. When such cleaning is required, the bridge 54 starts moving on demand and moves slowly, but continuously so that the shoe 88 slides along the bearing plate 84 and aligns with the ports 44 in succession. Backwash water is then introduced through the ports 44, once alignment between the shoe 88 and ports 44 is established, to flow upwardly through the filter media 40 and the corresponding cell to be received by the waste water manifold 76 which overlies such cell from which the water is appropriately discharged. This cleaning process is repeated at each cell during the bridge movement until the filter media is clean.

A certain amount of the material that has been captured by the filter media 40 escapes around the water manifold 76 during a backwash operation. Some of this material surfaces and floats on the water in the filter tank 24 as a scum layer. It is the skimming, collection and discharge of this surface scum that the present invention is directed to. Details of skimming structure for the inventive system are shown in FIGS. 5-10.

The bridge 54 has depending pipes 94, 96 which loosely carry a horizontal manifold 98 in the form of a pipe, which mounts and is in communication with the nozzles 60 that direct air or other fluid from the pressurized source 62 angularly downward, as shown in FIG. 8, towards the water surface 100 and end wall 18. As seen clearly in FIGS. 7 and 8, the manifold 98 is maintained slightly above the upper level 100 of the water in compartment 24 by a plurality of foam blocks 102 which are secured as by U-bolts 104 to the manifold 98. The blocks 102 have associated brackets 110, each having a flat surface 111 against which the manifold 98 is securely clamped through the U-bolts 104.

The nozzles 60 are arranged along the length of the manifold 98 in ports 120 in the leading portion of the manifold 98 so that their line makes an angle of approximately 45° with the plane of the upper surface 100 of the water. There is a port 112 provided in each end cap of the manifold 98 to accept a pipe nipple 116 which mounts one of the nozzles 60 so its line makes an angle of approximately 45° with the plane of the upper surface 100 of the water. The nozzles 60 cooperate with each other to discharge air in a pattern so that surface scum is forcibly skimmed in the direction of the wall 18 and scum collection pots.

The manifold 98 is free floating in a vertical direction by reason of the connection between the manifold 98 and pipes 94, 96, depending from the bridge 54. An anchoring plate 124 is fixedly attached to the manifold 98, as through a U-bolt 126. A second U-bolt 128 extends loosely around the pipe 96 and is secured to the plate 124 so that the pipe is captive between a curved surface 130 on the U-bolt 128 opening toward the pipe 96 and a flat surface 132 on the plate 124. With the pipe 96 against the surface 132 on the plate 124, a slight space X is maintained between the surface 130 and pipe 96. A similar mount (not shown) interconnects the manifold 98 and the pipe 94. This allows the manifold 98 to freely float up and down relative to the pipes 94, 96 in response to a change of water level in the compartment 24. The nozzles 60 thus remain at all times at a predetermined height above the water level.

Vertical shifting of the manifold 98 is facilitated by providing a flexible conduit 134 for communicating pressurized air or other fluid from the source 62 to the interior of the manifold 98. The conduit 134 bunches up as the manifold 98 moves upwardly and stretches out lengthwise in the opposite direction of movement of the manifold 98. Manually operated, vertical adjustment structure is also provided by threaded tie rods 136 for each pipe 94, 96, if needed, and is of a conventional construction.

The nozzles 60 are situated at the trailing portion of the bridge 54 as it moves towards the end wall 18. Accordingly, the surface scum progressively accumulates and is moved towards the end wall 18 under the force of the pressurized air exiting the nozzles 60. The extent of bridge travel in the direction of wall 18 is sufficient to direct surface scum over floating sleeves 144 into the collection pots 66.

The collection pots 66 are shown in FIGS. 5, 6, 11 and 12. Each pot has a fixed, cup-shaped, upwardly opening casing 138 with an inturned flange 140 at its upper edge, thereby defining a restricted opening bounded by an annular edge 142. The sleeve 144 is plastic and has a cylindrical body 146 with an outer surface 148 closely matched to the diameter of the edge 142 so that the sleeve 144 can be telescopingly moved in and out of the casing 138. Upward vertical movement of the sleeve 144 relative to the casing 138 is limited by a stop pin 150 in the sleeve body 146. A radially outwardly projecting, annular flange 152 is provided at the upper, axial end of the sleeve body 146. The flange 152 has an upwardly facing surface 154 and on its radially inwardmost edge a depending, annular skirt 156. The sleeve 144 and casing 138 cooperatively define a variable volume chamber 158 for collection of surface scum.

The sleeve 144 is designed to be of about the same density as the water that it displaces when submerged so that the sleeve 144 is consistently buoyed to a position wherein the upper surface 154 of the flange 152 is just below the upper surface 100 of the water. The surface scum moves towards the wall 18 and collection pots 66 for further disposal.

In a normal backwash operation, upon the filter media 40 being clogged, water from the influent channel 26 flows into the filter compartment 24 at an increasingly greater rate than water flows out into the effluent channel 28 as the filter media 40 begins to clog. Upon the water level rising to a predetermined level, shown by line 160 in FIG. 6, a conventional control 161 (FIG. 3) automatically initiates backwash. At the point of backwash initiation, the pot sleeve 144 assumes the upper phantom position in FIG. 12. As the foreign matter is cleaned from the filter, the water recedes to the level indicated at 162 and through the same control 161, the backwash operation is interrupted. The range of travel for the sleeve is indicated by Y in FIG. 6.

The chambers 158 of the pots 66 are interconnected through a collection manifold 164, which is rigidly connected to the pot casings 138 and communicates with the chambers 158 through ports 165 of the pots 66. The manifold 164 is rigidly anchored to the wall 18 through brackets 167. An upright pipe 168 is connected with the manifold 164 to draw off scum that accumulates in the pot chambers 158 and flows by gravity and/or pressure differential into the manifold 164. A discharge pump 67 draws collected surface scum through the pipe 168 and discharges the same through an outlet pipe 172, which delivers the scum to a discharge trough 174, through which the scum is directed to an appropriate disposal area.

It can be seen that the surface scum is positively skimmed towards the collecting pots for collection and disposal. Because the sleeve surface 154 is just below the water surface, the main flow into each pot 66 is surface water which carries the scum. Floating scum is thus removed through the pots 66 for further treatment or disposal without removing large volumes of the effluent.

I claim:

1. A liquid filter system for waste water comprising:
    a filter compartment for a liquid supply and having spaced side walls and first and second ends;
    a bridge spanning the side walls;
    means mounting the bridge for movement between the first and second compartment ends;
    means for moving the bridge between the first and second compartment ends;
    means on the bridge for progressively skimming and accumulating surface scum on the surface of said liquid supply and for moving accumulated surface scum towards one of the filter compartment ends as an incident of said bridge being moved by said moving means towards said one filter compartment end; and
    at least one floating pot adjacent the one compartment end to collect skimmed surface scum,
    said skimming means comprising a plurality of nozzles, means mounting the nozzles above the surface of the liquid supply, means for delivering a pressurized fluid to said nozzles, and means on the nozzles for directing the pressurized fluid angularly downwardly and toward the one filter compartment end.

2. A liquid filter system according to claim 1 wherein said pot has an upwardly opening fixed casing, a floating sleeve defining a scum withdrawal chamber in conjunction with the casing and having an upper opening and means mounting the sleeve for movement relative to the casing so that with the sleeve floating in a liquid in the filter compartment surface scum moves through said upper opening into the withdrawal chamber for collection therein.

3. A liquid filter system according to claim 1 wherein pump means are provided to draw off collected scum in the pot for disposal thereof.

4. A liquid filter system according to claim 1 wherein said skimming means has a float which is buoyed by the liquid in the filter compartment to maintain the nozzles at a predetermined height above the upper level of the liquid in the filter compartment.

5. A liquid filter system for waste water comprising:
    a filter compartment for a liquid supply and having first and second ends and laterally spaced side walls;
    a bridge spanning the side walls;
    means mounting the bridge for movement between the first and second compartment ends;
    a nozzle;
    means for delivering a pressurized fluid to said nozzle;
    float means for maintaining the nozzle above and adjacent to the upper level of a liquid in said filter compartment;
    means for connecting the nozzle to the bridge so that the nozzle is situated above the upper level of the liquid and skims surface scum toward said second end as an incident of the bridge moving towards the second end of the filter compartment;

a floating pot for collecting skimmed surface scum at said second end, said floating pot having a floating sleeve with a scum intake opening approximately at the level of the liquid in the filter compartment; and means for withdrawing scum from the pot for further treatment or disposal.

6. A liquid filter system according to claim 5 wherein a plurality of pots are provided at said second end and each pot comprises a fixed casing, the floating sleeve defines a scum collecting chamber in conjunction with the casing and means mount the sleeve for movement relative to the casing so that with the sleeve floating in a liquid in the filter compartment surface scum moves through said upper intake opening into the collection chamber of the pots.

7. A liquid filter system according to claim 6 wherein said sleeve has a hollow cylindrical body with a radially outturned flange with an upper surface at its upper axial edge and buoyant forces on the sleeve in a liquid in the filter compartment maintain the upper flange surface approximately at the upper level of the liquid in the filter compartment.

8. A waste water treatment system comprising:

a waste water receiving compartment having a supply of water upon which surface scum is accumulated;

a plurality of pots each with a casing and a floating sleeve having an opening therein and being movable relative to the casing, each said sleeve and casing cooperatively defining a variable volume scum collection chamber, the buoyancy of said sleeve in water being such that the sleeve opening is maintained approximately at the upper level of water in the waste water receiving compartment;

means for skimming surface scum towards said pots so that surface scum moves through said sleeve openings into the chambers;

means for drawing away accumulated scum in the collection chambers of the pots for disposal, said means for skimming comprising a supply of pressurized fluid and means for directing the pressurized fluid angularly downwardly and towards said pots so that surface scum is directed into the pots by said pressurized fluid;

means for moving the fluid directing means relative to said compartment towards said pots; and means for withdrawing scum from the pots for further treatment or disposal.

* * * * *